C. E. LLOYD.
BRAKE SOCKET FOR OPEN MOUTHED BILGE PUMPS.
APPLICATION FILED OCT. 23, 1917.
1,265,349.
Patented May 7, 1918.
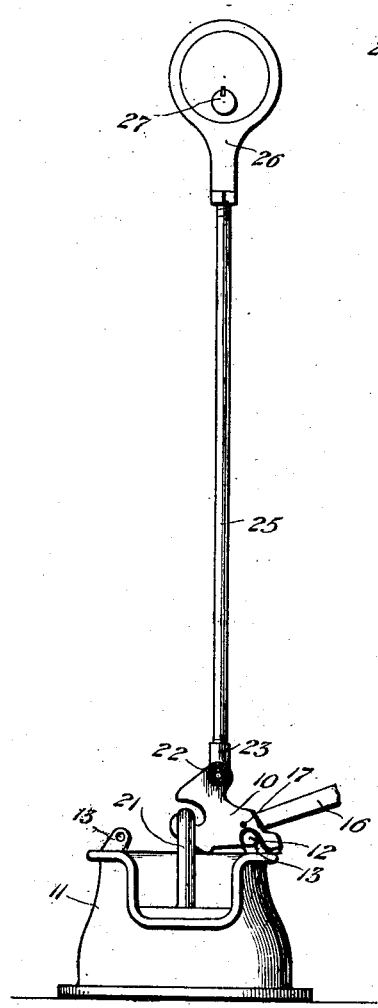
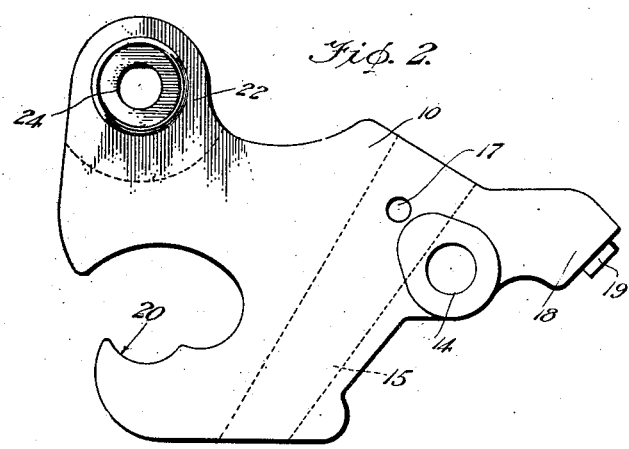
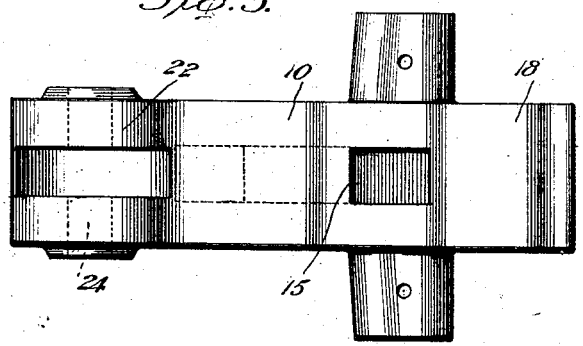
WITNESSES
INVENTOR
C. E. Lloyd,
BY
ATTORNEYS

UNITED STATES PATENT OFFICE.

CECIL E. LLOYD, OF PENSACOLA, FLORIDA.

BRAKE-SOCKET FOR OPEN-MOUTHED BILGE-PUMPS.

1,265,349.  Specification of Letters Patent.  Patented May 7, 1918.

Application filed October 23, 1917. Serial No. 198,140.

*To all whom it may concern:*

Be it known that I, CECIL E. LLOYD, a citizen of the United States, and a resident of Pensacola, in the county of Escambia and State of Florida, have invented a new and useful Improvement in Brake-Sockets for Open-Mouthed Bilge-Pumps, of which the following is a specification.

My present invention relates particularly to bilge pumps of the open mouthed type, and more especially to the brake sockets thereof, which engage the plungers and normally receive a hand lever in the socket thereof in order to in turn reciprocate the plungers, the object of my present improvement being the provision of a brake socket having means whereby a vertically movable power connection may be applied thereto for the power actuation of the plunger instead of the hand lever, which latter is movable generally in a horizontal plane.

My invention therefore resides specifically in the construction shown in the accompanying drawing, forming a part of this specification, and wherein:

Figure 1 is an elevation illustrating the practical application of my invention.

Fig. 2 is a detail side view of the brake socket removed and enlarged, and

Fig. 3 is a top plan view thereof.

Referring now to these figures, my invention is particularly directed to the brake socket 10, which is capable of pivotal mounting at either side of the upper portion of an open mouthed bilge pump generally indicated at 11, the pivotal connection being by means of a bolt 12 extended through integral ears 13 of the pump casing, and through an opening 14 transversely of the brake socket 10, the latter having the usual angular socket 15 therethrough, square in cross section and tapering from one end to the other, for the reception of the ordinary hand lever 16, the latter of which may be pinned in place by a suitable pin extended through an opening 17 of the brake socket.

The brake socket 10 further, has the usual angular extension 18 having a buffer 19, and is provided at its opposite side with a cavity 20 into which the yoke 21 of the plunger extends, in use.

As constructed as thus far described, the brake lever is of the usual hand operated type, in connection with which my invention proposes the attachment of power connections, by providing the brake socket with a generally vertical extension 22 above its plunger cavity 20 and consisting of side ears laterally spaced with respect to one another to receive between them, the lower portion of a threaded socket 23, as seen in Fig. 1, the extension 22 proposed by my invention having its ears provided with openings 24 to aline with a similar opening of the socket 23 and receive a bolt pivotally connecting these parts.

In this way, the threaded socket 23 may receive the lower end of a connecting rod 25, the upper end of which is connected to an eccentric 26 or the like, of a power shaft 27 or a shaft suitably connected to a source of power. It is obvious, however, that the connecting rod 25 may lead to a crank or other connecting member at the shaft 27 for bringing about the desired throw, vertical reciprocating movements of the connecting rods shifting the brake socket 10 vertically to bring about similar movement of the plunger of the pump 11 in substantially the same manner as at present brought about by the use of the hand lever 16.

It is obvious from the foregoing that my invention provides for a rigid, strong and durable power connection for a brake socket, capable of a vertical application of power such as would be impossible by any means connected to the usual hand lever, and that it will for these reasons, be highly effective and efficient in use.

I claim:

1. A brake socket for open mouthed bilge pumps having the usual cavity for the reception of a plunger yoke and having a pivot opening and a hand lever socket, provided with a generally vertical extension above its said yoke receiving cavity, said extension being apertured, for the purpose described.

2. A brake socket for open mouthed bilge pumps having the usual cavity for the reception of a plunger yoke and having a pivot opening and a hand lever socket, provided with a generally vertical extension above its said yoke receiving cavity, said extension consisting of laterally spaced ears and having apertures through the said ears, for the purpose described.

CECIL E. LLOYD.

Witnesses:
T. O. FILLETTE,
R. P. STUBBINS.

Copies of this patent may be obtained for five cents each, by addressing the "Commissioner of Patents, Washington, D. C."